United States Patent
Rieper et al.

[11] 3,910,875
[45] Oct. 7, 1975

[54] DISAZO COMPOUNDS CONTAINING 3-AMIDO-PYRAZOLE-5-ONE COMPONENTS

[75] Inventors: Wolfgang Rieper, Frankfurt am Main; Joachim Ribka, Offenbach (Main), both of Germany

[73] Assignee: Hoechst Aktiengesellschaft, Frankfurt am Main, Germany

[22] Filed: Jan. 5, 1973

[21] Appl. No.: 321,242

[30] Foreign Application Priority Data
Jan. 7, 1972  Germany............................ 2200659

[52] U.S. Cl................ 260/161; 260/160; 260/208; 106/288 Q
[51] Int. Cl.²...................... C09B 33/12; D06P 1/04
[58] Field of Search............ 260/161, 160, 162, 163

[56] References Cited
UNITED STATES PATENTS

| | | | |
|---|---|---|---|
| 2,435,182 | 1/1948 | Long et al............................ | 260/163 |
| 2,908,677 | 10/1959 | Straley et al..................... | 260/163 X |
| 3,366,619 | 1/1968 | DeLucia et al...................... | 260/161 |
| 3,567,707 | 3/1971 | Neave et al......................... | 260/161 |

FOREIGN PATENTS OR APPLICATIONS

| | | | |
|---|---|---|---|
| 1,067,518 | 5/1967 | United Kingdom................. | 260/163 |
| 1,112,232 | 8/1961 | Germany............................ | 260/161 |

*Primary Examiner*—Floyd D. Higel
*Assistant Examiner*—C. F. Warren
*Attorney, Agent, or Firm*—Curtis, Morris & Safford

[57] ABSTRACT

Disazo pigment of the general formula

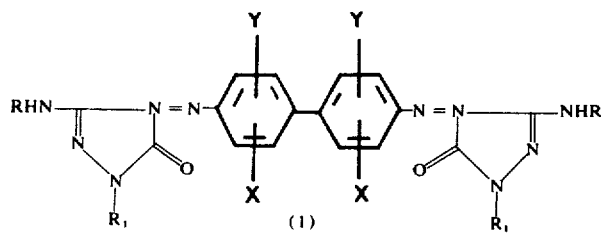

wherein X and Y represent hydrogen or halogen atoms, preferably chlorine atoms, alkyl groups, preferably methyl groups, alkoxy groups, preferably methoxy and ethoxy groups, or nitro groups, R represents benzoyl, hexahydrobenzoyl, alkanoyl, alkylsulfonyl, phenylacetyl, arylsulfonyl, aralkylsulfonyl, alkylcarbamoyl, arylcarbamoyl, alkylthiocarbamoyl or arylthiocarbamoyl groups and $R_1$ represents a hydrogen atom or a phenyl ring which may be substituted by 1 – 3 alkyl, alkoxy, halogen or nitro groups and a process for preparing them which comprises bisdiazotizing diamines of the general formula

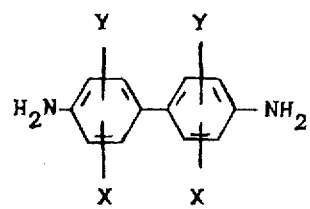

and coupling them with 2 moles of a pyrazolone derivative of the formula

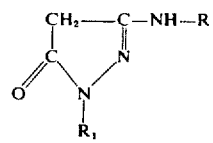

The new pigment pigments are suitable for the coloring of printing pastes, color lakes and dispersion paints, for the dyeing of plastics and natural resins or artificial resins, such as polymerization or condensation resins. They are furthermore suitable for the pigment printing on a substrate, especially on textile fibers. They may be used for the dyeing of artificial silk made from viscose or cellulose ethers or esters, polyamides, polyurethanes, polyglycol terephthalates or polyacrylonitrile in the spinning mass or for the dyeing of paper.

The new pigments have extremely high tinctorial strengths with mostly very pure shades.

6 Claims, No Drawings

DISAZO COMPOUNDS CONTAINING 3-AMIDO-PYRAZOLE-5-ONE COMPONENTS

The present invention relates to new valuable water-insoluble disazo pigments of the general formula

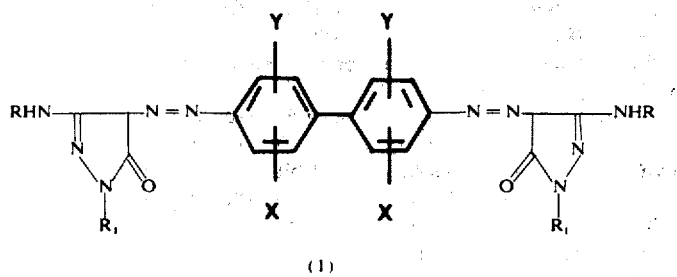

(1)

wherein X and Y represent hydrogen or halogen atoms, preferably chlorine atoms, alkyl groups, preferably methyl groups, alkoxy groups, preferably methoxy and ethoxy groups, or nitro groups, R represents benzoyl, hexahydrobenzoyl, alkanoyl, phenylacetyl alkylsulfonyl, arylsulfonyl, aralkylsulfonyl, alkylcarbamoyl, arylcarbamoyl, alkylthiocarbamoyl or arylthiocarbamoyl groups and $R_1$ represents a hydrogen atom or a phenyl ring which may be substituted by 1 – 3 alkyl, alkoxy, halogen or nitro groups.

The invention also provides a process for preparing these pigments which comprises bisdiazotizing diamines of the general formula

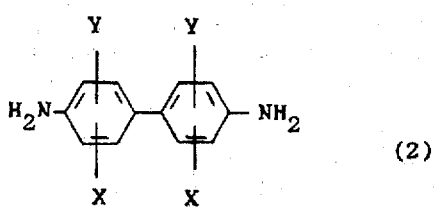

(2)

and coupling them with 2 moles of a pyrazolone derivative of the formula

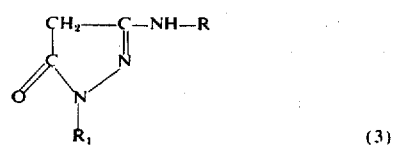

(3)

wherein X, Y, R and $R_1$ have the above meanings.

As substituents R there may be mentioned open-chained alkanoyl, alkylsulfonyl, alkylcarbamoyl or alkylthiocarbamoyl groups containing 1 – 6, preferably 1 – 4 carbon atoms in the alkyl moiety and alicyclic groups with preferably six ring carbon atoms. Further-, more, there may be mentioned aralkanoyl and aralkylsulfonyl groups, as well as aroyl, arylsulfonyl, arylcarbamoyl and arylthiocarbamoyl groups, preferably of the benzene series, which may be furthermore substituted by one to three halogen atoms, lower alkyl, lower alkoxy or nitro groups.

There are preferred the disazo pigments of the general formula

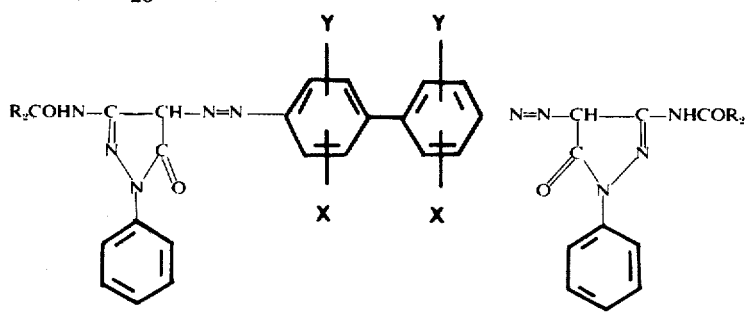

wherein X and Y have the meanings given above and $R_2$ represents a lower alkyl group.

As diazo components of the formula (2), there may be mentioned all substituted 4,4'-diamino-diphenyls, for example 2,2'-dimethyl-benzidine, 3,3'-dimethyl-benzidine, 2,2'-dimethoxy-benzidine, 3,3'-dimethoxy-benzidine, 3,3'-diethoxy-benzidine, 2,2'-dichloro-benzidine, 3,3'-dichlorobenzidine, 2,2',5,5'-tetrachloro-benzidine, 2,2'-dichloro-3,3'-dimethyl-benzidine, 2,2'-dichloro-5,5'-dimethoxy-benzidine, 2,2'-dinitro-benzidine or 3,3'-dinitrobenzidine.

The coupling components of the general formula (3) are obtained by reacting cyanoacetic acid esters or β-alkoxy-β-imino-propionic acid esters with hydrazine, hydrazine hydrate or the accordingly substituted phenyl hydrazines. The substituent R is then introduced into the 3-amino-pyrazole-5-ones thus obtained by a further reaction with aliphatic, cycloaliphatic, aromatic or alkylaromatic carbonic acid chlorides or anhydrides, alkyl or arylsulfonic acid chlorides or with alkyl or aryl-iso-cyanates or isothiocyanates in appropriate organic solvents, for example glacial acetic acid, nitrobenzene or pyridine, optionally in the presence of a catalyst such as aluminium trichloride, zinc chloride, iron trichloride.

As compounds introducing the radical R there are mentioned, for example, acetanhydride, acetyl chloride, propionyl chloride, pivaloyl chloride, hexahydrobenzoyl chloride, phenyl acetyl chloride, benzoyl chloride, 4-chlorobenzoyl chloride, 3-bromobenzoyl chloride, 3,4-dimethoxybenzoyl chloride, 3-nitrobenzoyl chloride, 4-isopropylbenzoyl chloride, 2,4-dimethylbenzoyl chloride, 3,5-dinitrobenzoyl chloride. 2,4,6-trimethylbenzoyl chloride, methylsulfonic acid chloride, ethylsulfonic acid chloride, phenylsulfonic acid chloride, p-toluylsulfonic acid chloride, 4-methoxy-benzene-sulfonic acid chloride, 1,2,4-trimethylbenzene-5-sulfonic acid chloride, 1-nitro-4-chlorobenzene-3-sulfonic acid chloride, 4-nitro-1,3-dimethylbenzene-6-sulfonic acid chloride, 1-ethoxy-benzenesulfonic acid-(2)-chloride, 4-chloro-1-ethoxy-benzenesulfonic acid chloride, 1,2,4-trichlorobenzene-5-sulfonic acid chloride, phenylisocyanate, 2-nitrophenyl-isocyanate, 4-methylphenylisocyanate, n-butylisocyanate, phenylisothiocyanate, 4-ethoxyphenylisothiocyanate, 4-chlorophenylisothiocyanate, 3,4-dichlorophenylisothiocyanate, or 4-propylphenylisothiocyanate.

Besides hydrazine and phenylhydrazine there may be mentioned substituted phenylhydrazines, for example m-tolylhydrazine, p-tolylhydrazine, p-methoxyphenylhydrazine, p-chlorophenylhydrazine, p-nitrophenylhydrazine, 2,4-dichlorophenylhydrazine, 2-chloro-4-nitrophenylhydrazine, 4-chloro-2-nitrophenylhydrazine, 4-methylphenylhydrazine, 2,4,6-trichlorophenylhydrazine, or 4-chloro-2-methylphenylhydrazine.

The disazo dyestuffs of the present invention are prepared according to known methods by coupling the bis-diazotized aromatic amines with 2 moles of the coupling components in an aqueous medium, advantageously in the presence of a non-ionogenic, anion active or cation active dispersion agent or in the presence of an organic solvent. The coupling reaction may also be performed in organic solvents.

In order to obtain a particularly favourable crystalline structure, particle size and grain size distribution, the dyestuff suspension obtained after the coupling is still heated for a certain time at a temperature between 50° and 150°C, if necessary in the presence of organic solvents such as methanol, ethanol, isopropanol, benzene, toluene, xylene, chlorobenzene, dichlorobenzene, nitrobenzene, benzoic acid ester or pyridine. Particularly pure and fast dyeings are obtained with the pigments of the present invention when they are subjected after the coupling in the form of wet press cakes or as dry goods to a treatment with organic solvents, such as ethanol, isopropanol, pyridine, dimethylformamide, N-methylpyrrolidone, glacial acetic acid, chlorobenzene, dichlorobenzene, nitrobenzene, benzoic acid ester, if necessary in the presence of emulsifiers at an elevated pressure, if required under pressure, or when the dyestuffs are ground with the use of grinding auxiliaries.

The new pigment pigments are suitable for the preparation of printing pastes, color lakes and dispersion paints, for the dyeing of plastics and natural resins or artificial resins, such as polymerization or condensation resins. They are furthermore suitable for the pigment printing on a substrate, especially on textile fibers, but also on other sheet-like structures, such as paper. The pigments of the present invention may be used for other purposes, for example in finely divided form for the dyeing of artificial silk made from viscose or cellulose ethers or esters, polyamides, polyurethanes, polyglycol terephthalates or polyacrylonitrile in the spinning mass or for the dyeing of paper.

The pigments can be well worked up in the aforementioned media and exhibit extremely high tinctorial strengths with mostly very pure shades. They have good resistance to influence of heat and chemical substances, particularly solvents, acids and alkalies. The dyeings are distinguished by good fastness to light and weather and, generally, by very good fastness to migration and, as regards their qualities, they exceed the known next comparable pigments of the general formula

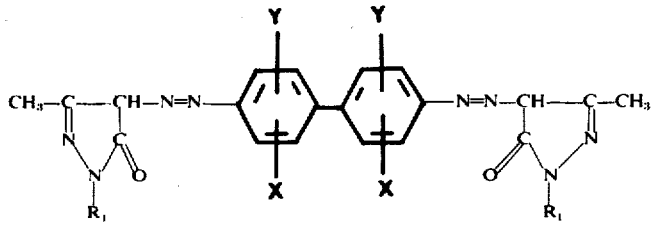

wherein X, Y and $R_1$ have the afore-mentioned meanings.

The following examples serve to illustrate the invention, the parts being by weight unless stated otherwise.

EXAMPLE 1

25.3 Parts of 3.3'-dichlorobenzidine were stirred up for about 12 hours in 100 parts by volume of 5N-hydrochloric acid. The whole was then diluted with ice water to 400 – 500 parts by volume. The mixture was diazotized at 0° – 5°C with 41 parts by volume of a 5N-sodium nitrite solution, clarified and the nitrite in excess was destroyed with amidosulfonic acid.

43.5 Parts of 1-phenyl-3-acetaminopyrazolone-(5) were suspended in a second vessel in 750 parts by volume of water and dissolved at 5° – 10°C by adding 110 parts by volume of a 2N-sodium hydroxide solution.

10 Parts by volume of a 10 % aqueous solution of the reaction product from 1 mole of oleyl alcohol and 30 moles of ethylene oxide were added to the clarified alkaline solution which was then slowly dropped into the diazo solution.

After completion of the coupling the dyestuff suspension obtained was heated for 1 hour at 90°C. The red orange product was suction-filtered, thoroughly washed with water and dried at 60° – 70°C. The pulverized dyestuff was then suspended in about 500 parts by volume of glacial acetic acid and the suspension was heated for 4 to 5 hours at 100°C.

The pigment obtained after suction-filtration, washing, drying and milling corresponded to the formula

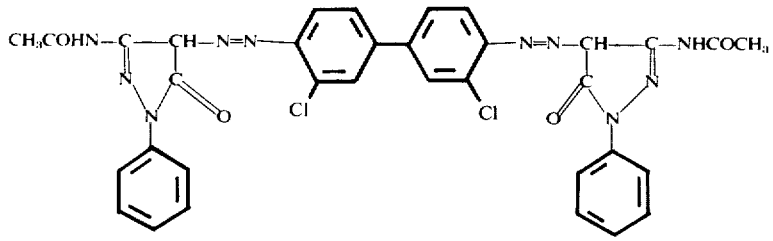

and possessed an extraordinarily high tinctorial strength and excellent fastnesses.

When 0.8 part of this pigment, 2.4 parts of aluminium hydroxide and 4.8 parts of a printer's varnish were mixed and ground on a three-roller mill, a printing paste was obtained which yielded orange prints of extraordinary tinctorial strength and a very good fastness to light.

Due to its high fastness to solvents and satisfactory fastness to migration as well as to its fastness to heat, the dyestuff was suitable for being incorporated into polyvinyl chloride, into a lacquer or a spinning mass, and the dyeings obtained had a pure shade and a very good fastness to light.

EXAMPLE 2

24.4 Parts of o-dianisidine were diazotized as described in Example 1.

44.5 Parts of 1-phenyl-3-propionylamino-pyrazolone-(5) were suspended in a second vessel in about 500 parts by volume of water and dissolved at 5° – 10°C by adding 110 parts by volume of a 2N-sodium hydroxide solution.

After clarification this solution was dropped within 1 hour at 5° – 10°C, simultaneously with the diazo solution, into a dome-shaped vessel containing a mixture of 200 parts by volume of a 4N-sodium acetate solution, 100 parts by volume of glacial acetic acid and 10 parts by volume of a 10 % aqueous solution of a reaction product from 1 mol of stearyl alcohol and 20 moles of ethylene oxide.

After completion of the coupling, the suspension was heated for 30 minutes to 90° – 95°C. The dyestuff obtained was suction-filtered, washed with water until free from salt, dried at 60° – 70°C, and the ground product was stirred into 500 parts by volume of dimethyl formamide or glacial acetic acid. After heating for 2 to 4 hours at 100°C, the dyestuff was suction-filtered, washed with water, dried and ground.

The deep red pigment pigment thus obtained corresponded to the formula and was distinguished by the purity of its shade, a very high tinctorial strength and very good fastnesses.

A product of same high quality was obtained when after suction-filtration of the aqueous pigment suspension the obtained press cake which was washed until free from salt was again suspended in 1,000 parts by volume of water and heated for 2 to 4 hours to 125° – 150°C in a closed vessel.

When 67 parts of polyvinyl chloride, 31 parts of a mixture of equal parts of dioctylphthalate and dibutylphthalate, 2 parts of a stabilizer and 0.1 part of the afore-mentioned dyestuff were mixed for 15 minutes at 150°C on a rollermill and worked up to a foil, the shade of this foil was distinguished by a high hiding power, an unobjectionable fastness to migration and excellent fastness to light.

A pigment of likewise high quality was obtained by reacting 1-phenyl-3-acetamino-pyrazolone-(5) with bisdiazotized o-dianisidine.

EXAMPLE 3

24.4 Parts of o-dianisidine were diazotized as described in Example 1.

56 Parts of 1-phenyl-3-benzoyl-amino-pyrazolone-(5) were introduced at 5° – 10°C in a second vessel containing a mixture of 800 parts by volume of water and 20 parts by volume of a 33 % sodium hydroxide solution. The solution was clarified and, after addition of 10 parts by volume of a 10 % solution of an emulsifier, dropped within 1 hour at 10° – 20°C into the diazo solution.

After completion of the coupling, the dark red pigment suspension was heated for 10 minutes at 90°C, suction-filtered, washed until neutral and dried. The ground pigment was heated for 2 to 4 hours at 100°C in dimethylformamide in order to obtain a maximum tinctorial strength and plasticity of the grain. The pigment was suction-filtered, washed with hot water, dried and ground.

The pigment obtained corresponded to the formula

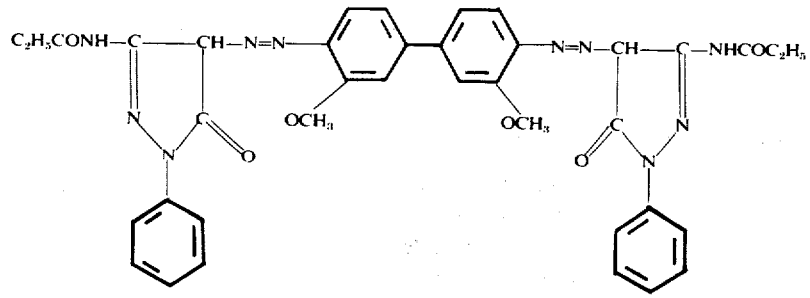

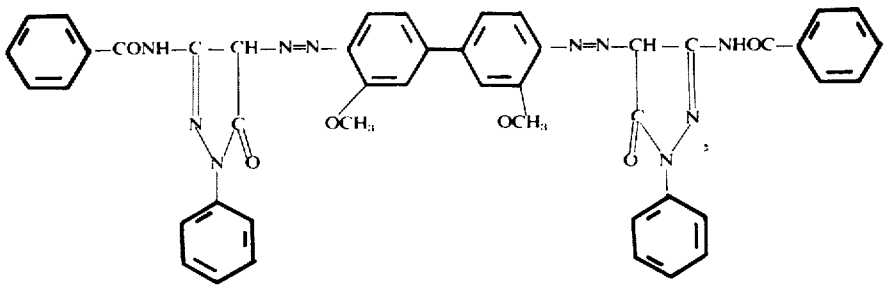

and, when being incorporated into polyvinyl chloride, polyethylene, a lacquer or a printing paste, it yielded red dyeings of a very high fastness to heat, as well as a good fastness to light and solvents.

at 150°C with 700 parts by volume of isopropanol in a closed system.

After suction-filtration, drying and grinding, an orange pigment of the formula

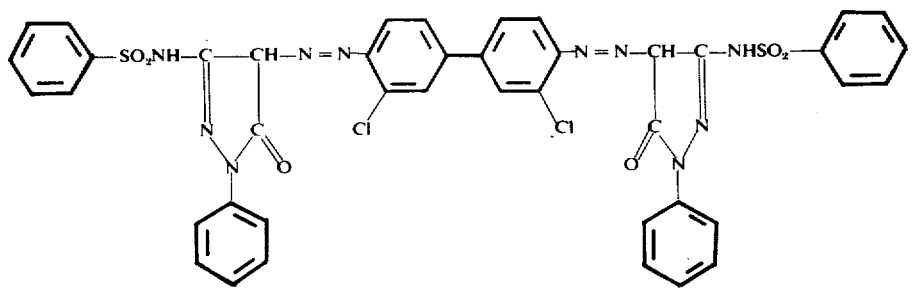

EXAMPLE 4

21.3 Parts of o-toluidine were diazotized as described in Example 1 and coupled under the conditions indicated in Example 3 with 55 parts of 1-phenyl-3-ethyl-sulfonylamino-pyrazolone-(5). The press cake obtained after suction-filtration and washing was suspended in about 500 parts by volume of isopropanol and heated in a closed vessel for 2 to 4 hours at 150°C. After cooling, the deep red pigment was suction-filtered, dried and ground.

The disazo pigment obtained corresponded to the formula was obtained which, when being incorporated into polyvinyl chloride, polyethylene, lacquers printing pastes or spinning masses, yielded dyeings of a high fastness to light and solvents.

EXAMPLE 6

24.4 Parts of o-dianisidine were diazotized as described in Example 1.

In a second vessel, 52 parts of 1-(p-chlorophenyl)-3-acetamino-pyrazolone-(5) were dissolved under the

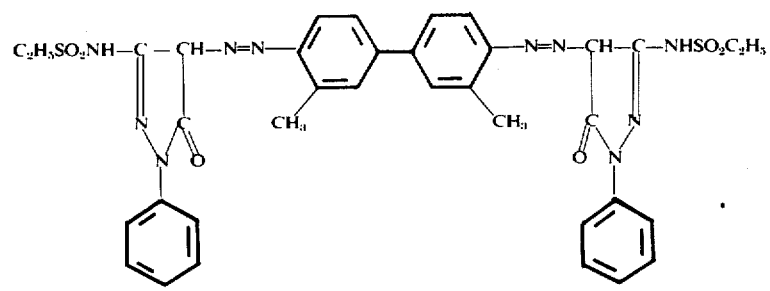

and yielded full red dyeings of a very pure shade and a good fastness to light and solvents when being incorporated into polyvinyl chloride, a lacquer, a printing paste or a spinning mass.

EXAMPLE 5

25.3 Parts of 3,3'-dichlorobenzidine were diazotized in the manner described in Example 1 and coupled with 63 parts of 1-phenyl-3-phenylsulfonylamino-pyrazolone-(5).

After completion of the coupling, the pigment suspension was heated for 30 minutes at 90°C, suction-filtered and washed with water until free from salt. The press cake thus obtained was heated for about 3 hours conditions described in in Example 2 to give an alkaline solution.

This solution was dropped, simultaneously with the solution of the bisdiazotized o-dianisidine, into a buffer solution as described in Example 2. After completion of the coupling, the pigment suspension was heated for 30 minutes to 1 hour at 90°C the pigment was suction-filtered, washed until free from salt and dried. The ground product was heated for 4 – 6 hours at 100° – 150°C in dimethylformamide in order to obtain a maximum tinctorial strength. The product was suction-filtered, washed with alcohol, dried and ground.

The dark violet pigment thus obtained corresponded to the formula

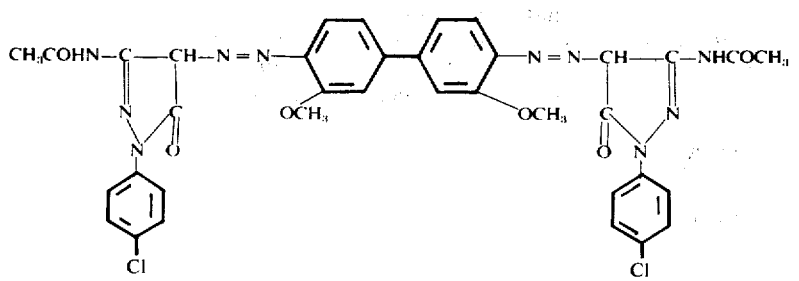

and yielded, when being incorporated into polyvinyl chloride, into a lacquer or a printing paste very intense dyeings with dark claret shades possessing a very good fastness to light and solvents.

EXAMPLE 7

When under the conditions described in Example 6 the bis-diazotized o-dianisidine was reacted with 48 parts of 1-(p-tolyl)-3-acetamino-pyrazolone-(5), a pigment of the formula ond vessel and the coupling component was dissolved by adding 20 parts by volume of a 33 % sodium hydroxide solution.

Both solutions were clarified and dropped simultaneously at 5°–10°C, as described in Example 2, into a buffer solution prepared in the coupling vessel. After completion of the coupling, the pigment suspension was heated for 1 – 2 hours at 90°C, the pigment was suction-filtered, washed until neutral and dried.

The ground pigment dyestuff thus obtained corresponded to the formula

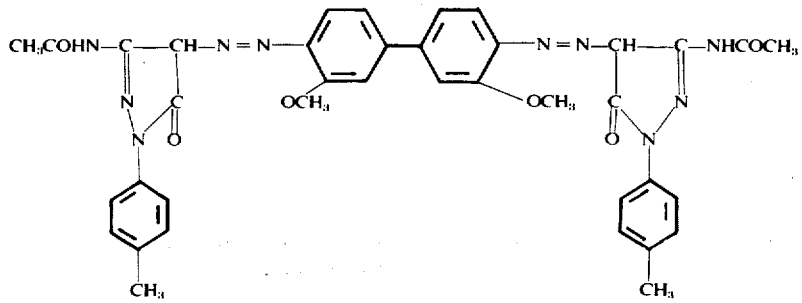

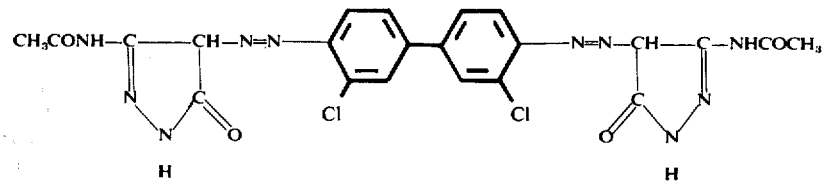

was obtained which, when being incorporated into the polyvinyl chloride, into a lacquer or a printing paste, yielded blue red dyeings of a very good fastness to light.

EXAMPLE 8

25.3 Parts of 3,3'-dichlorobenzidine were diazotized as described in Example 1.

28.2 Parts of 3-acetamino-pyrazolone-(5) were stirred into about 600 parts by volume of water in a second and, when being incorporated into polyvinyl chloride, yielded bluish red dyeings possessing a good fastness to light and migration.

EXAMPLE 9

24.4 Parts of 3,3-dimethoxybenzidine were diazotized as described in Example 1 and coupled with 43.5 parts of 1-phenyl-3-acetaminopyrazolone-(5).

A pigment of the formula

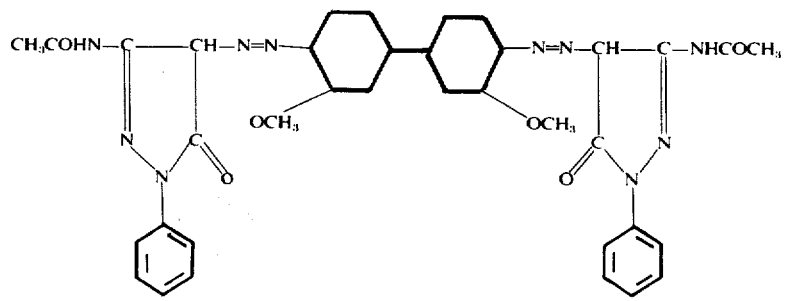

was obtained.

In the same manner there was obtained from 21.2 parts of 3,3-dimethylbenzidine the pigment of the formula

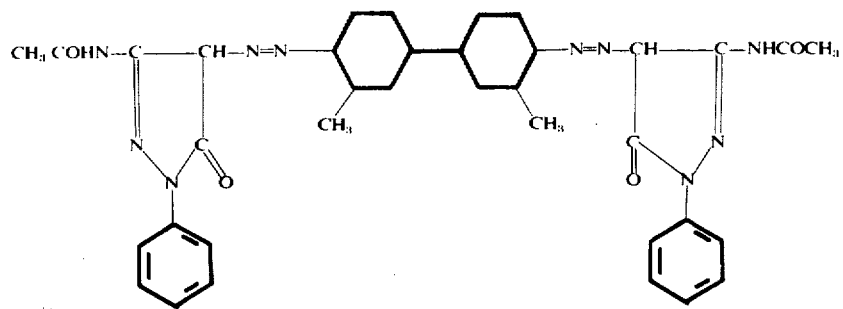

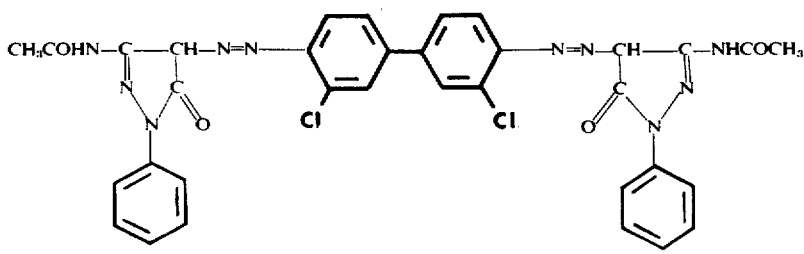

4. A dyestuff of the formula
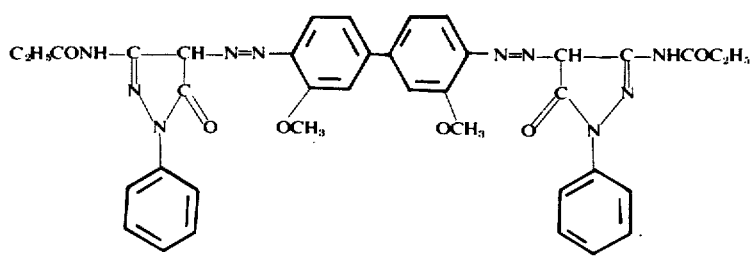
6. A dyestuff of the formula
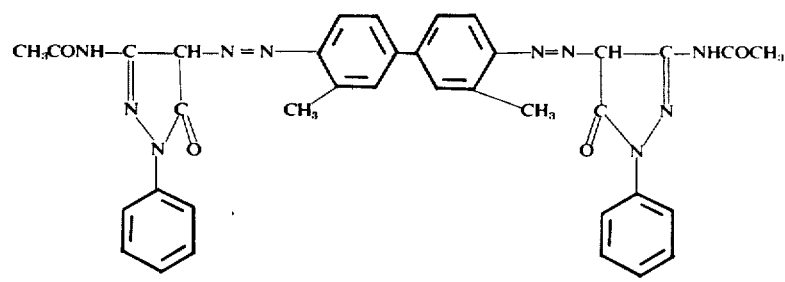
5. A dyestuff of the formula
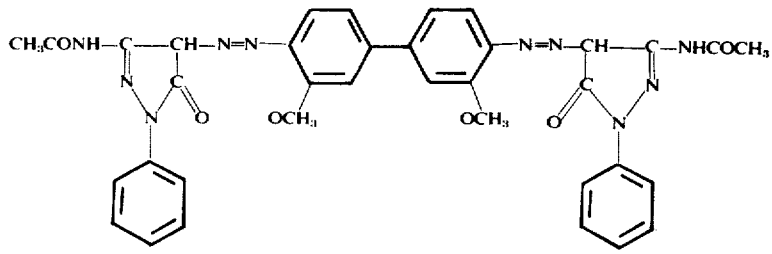

We claim:
1. A pigment of the formula

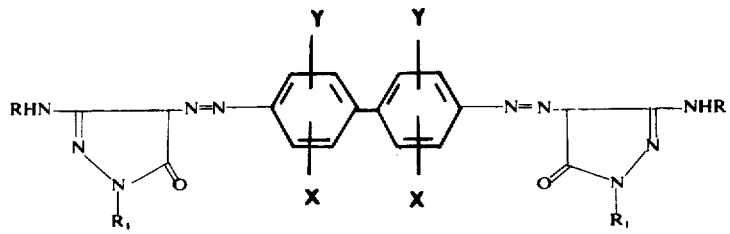

in which X and Y are hydrogen, chlorine, bromine, alkyl of one to four carbon atoms, alkoxy of one to four carbon atoms or nitro, R is alkanoyl, alkylsulfonyl, alkylcarbamoyl or alkylthiocarbamoyl, each having one to six carbon atoms in the alkyl moiety, benzoyl, hexahydrobenzoyl, phenylacetyl, phenylsulfonyl, phenylcarbamoyl or phenylthiocarbamoyl wherein each of said benzoyl or phenyl groups may be substituted by one to three substituents selected from the group consisting of alkyl of one to four carbon atoms, alkoxy of one to four carbon atoms, chlorine, bromine and nitro, and $R_1$ is hydrogen, phenyl or phenyl substituted by alkyl of one to four carbon atoms, alkoxy of one to four carbon atoms, chlorine, bromine or nitro.

2. A pigment of the formula

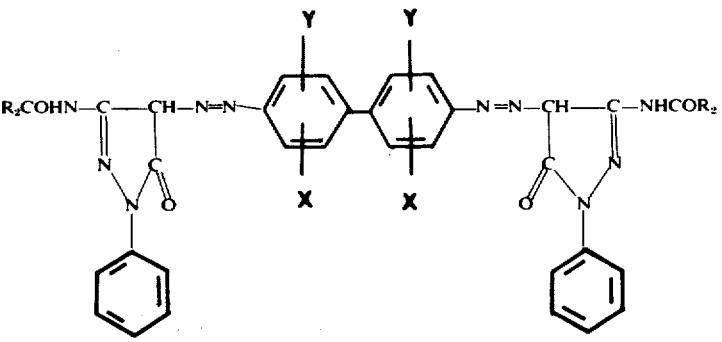

in which X and Y are hydrogen, chlorine, bromine, alkyl of one to four carbon atoms, alkoxy of one to four carbon atoms or nitro and $R_2$ is alkyl of one to four carbon atoms.

3. A dyestuff of the formula